(No Model.)
F. H. DANIELS.
MUSICAL DIAL.
No. 550,161. Patented Nov. 19, 1895.
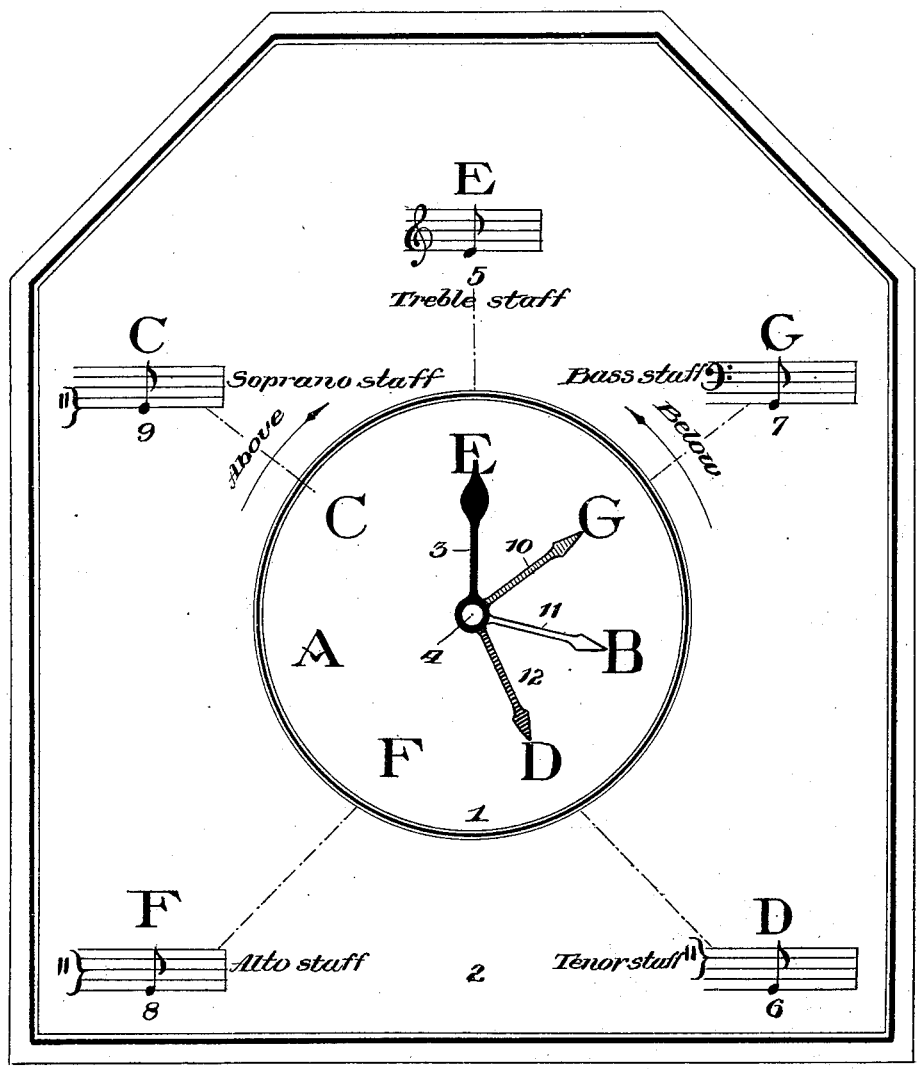
Witnesses
L. C. Hills
F. B. Keefer
Inventor:
Frank H. Daniels
by Marcellus Bailey
his Atty

UNITED STATES PATENT OFFICE.

FRANK HERBERT DANIELS, OF BROOKLYN, NEW YORK.

MUSICAL DIAL.

SPECIFICATION forming part of Letters Patent No. 550,161, dated November 19, 1895.

Application filed August 21, 1895. Serial No. 559,979. (No model.)

*To all whom it may concern:*

Be it known that I, FRANK HERBERT DANIELS, of Brooklyn, in the county of Kings and State of New York, have invented a certain new and useful Musical Dial, of which the following is a specification.

The object of this invention is to provide means whereby one can learn expeditiously to read with facility the notes in any one of the five clefs or staffs in written music—viz., the treble, bass, soprano, alto, and tenor clefs. The means employed by me for this purpose, and which, for lack of a better term, I denominate a "musical dial," consists, essentially, of a dial proper upon which are affixed or imprinted the designations of the seven notes A to G, inclusive, which follow each other in a certain prescribed order—*e. g.*, E, G, B, D, F, A, C—and in conjunction with said dial an index-hand to point to any one of those letters. In conjunction with this main index hand or pointer I may, and prefer to, use auxiliary pointers, which move with the main pointer, and which designate the common chord, and chord of the seventh, of whatever note the main hand may point to—as, for example, if the main hand points to E the auxiliary hands will point to G B D, E G B being the common chord and E G B D being the chord of the seventh. The letters upon the dial are so arranged that reading in one direction from the letter pointed to will give the notes above, and in the other direction will give the notes below, the note designated by the letter to which the main hand points.

The nature of my invention will be readily understood by reference to the accompanying drawing, which represents, in its preferred form, the embodiment of my invention.

The dial proper is indicated at 1. It in this instance is circular in form and is imprinted or otherwise formed upon a suitable cardboard or other base or support 2. Around the dial and at equal intervals apart are placed the designations of the seven musical notes, consisting, in this instance, of the letters A to G, inclusive. They follow each other in prescribed order, as shown—E, G, B, D, F, A, C. In connection with the dial proper is an index or pointer 3, movable so that its point or index end may be brought opposite to any one of the letters on the dial. As the letters are arranged circularly in this instance, the index is pivoted at the center 4 of the dial, so that it may be swung on that center from one to another of the letters, as desired. With a device thus constructed and arranged it is an easy matter to read music in any clef. In the treble clef, for example, as indicated at 5, the first or lower line is E. By turning the pointer or index 3 to E, reading to the right from that point around the dial, will give the notes on the successive lines above the lower line, while reading to the left from that point around the dial will give the note on the successive lines below the lower line.

In the drawing the arrows and the words "above" and "below," which accompany them, indicate the two directions in which the dial is to be read for the purposes above indicated; and so for the tenor clef, (indicated at 6,) the first line of which is D, by turning the index to D on the dial, then reading to the right, will give the lines above and reading to the left will give the lines below. In the same way—*mutatis mutandis*—the bass, alto, and soprano clefs or staffs 7 8 9 can be read.

I have arranged the clef-indicators around the dial, so that each shall be opposite or nearly opposite to that letter on the dial which is the first line of that particular clef; but this is not at all indispensable. It is convenient to have these clef-indications on the card for reference, and they can be placed thereon in any desired position.

In conjunction with the main or principal index 3 I prefer to use auxiliary pointers, such as shown at 10 11 12, which are attached to and move with the main index. These, in conjunction with the main index 3, serve to designate the common chord and chord of the seventh of the key typified by the letter to which the main index points—as, for example, with the main hand 3 pointing to E the three hands 3 10 11 will indicate the common chord and the hands 3 10 11 12 the chord of the seventh of that key. The hands or pointers may be of different colors, if desired.

Having described my invention and the manner in which the same is or may be carried into effect, what I claim herein as new and of my own invention, and desire to secure by Letters Patent, is—

1. A musical dial comprising a dial proper bearing the musical notation letters A to G inclusive, following each other thereon in the order of triads, and a movable main index hand or pointer 3, substantially as and for the purposes hereinbefore described.

2. A musical dial comprising a dial proper bearing the musical notation letters A to G inclusive following each other thereon in the order of triads, a movable main index hand or pointer 3, and auxiliary pointers connected to and moving with the main pointer and arranged in position to point to those letters on the dial indicative of chords of the key to which the main pointer is set, substantially as and for the purposes hereinbefore set forth.

In testimony whereof I have hereunto set my hand this 17th day of August, 1895.

FRANK HERBERT DANIELS.

Witnesses:
    BENJ. P. MORRIS,
    M. PURCELL.